Dec. 12, 1950  J. B. ARMITAGE ET AL  2,533,753
MACHINE TOOL CONTROL MECHANISM
Filed Feb. 27, 1947   5 Sheets-Sheet 1

INVENTORS
Joseph B. Armitage
Orrin W. Barker
BY W. D. O'Connor
ATTORNEY

INVENTORS
Joseph B. Armitage
Orrin W. Barker
BY
W. D. O'Connor
ATTORNEY

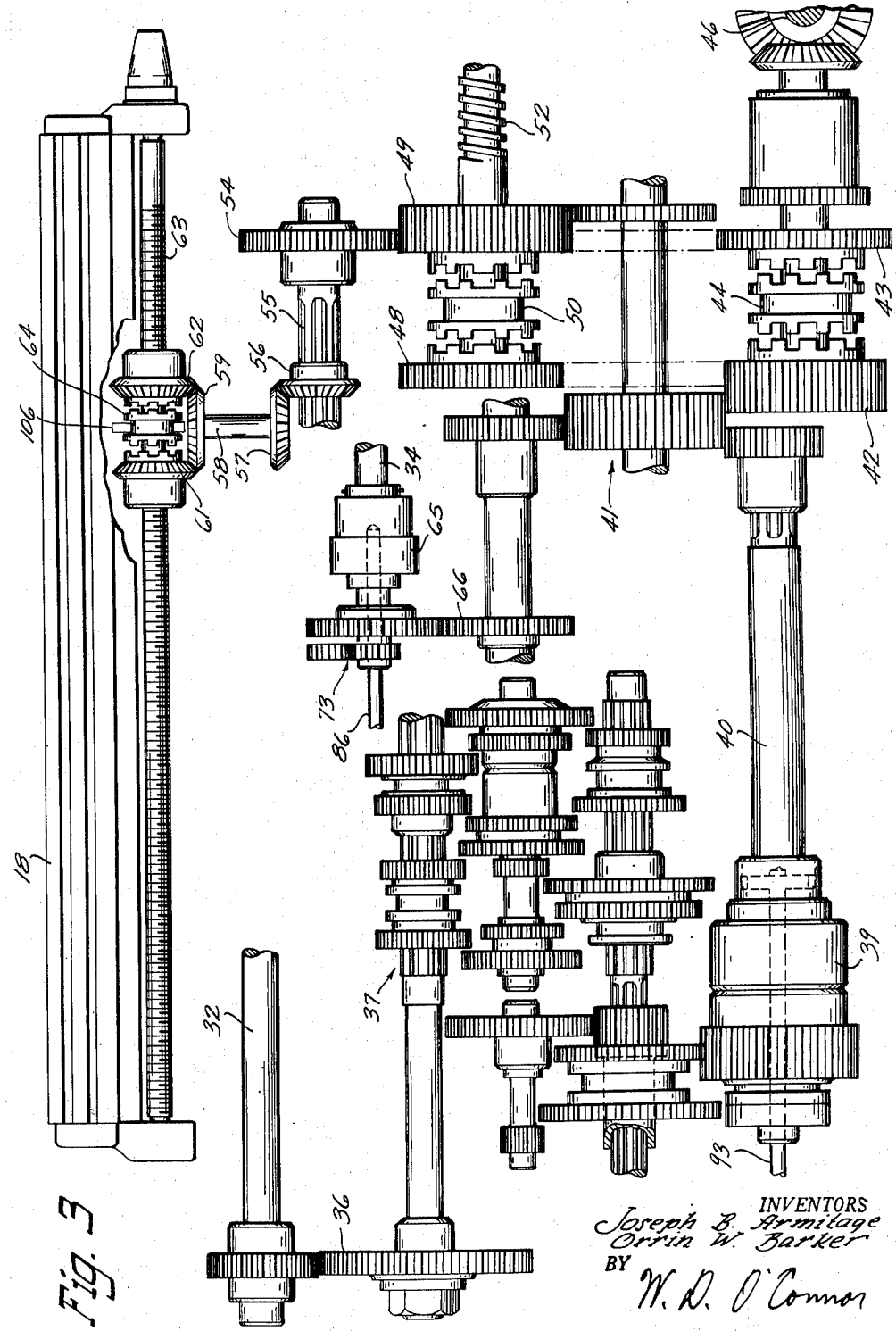

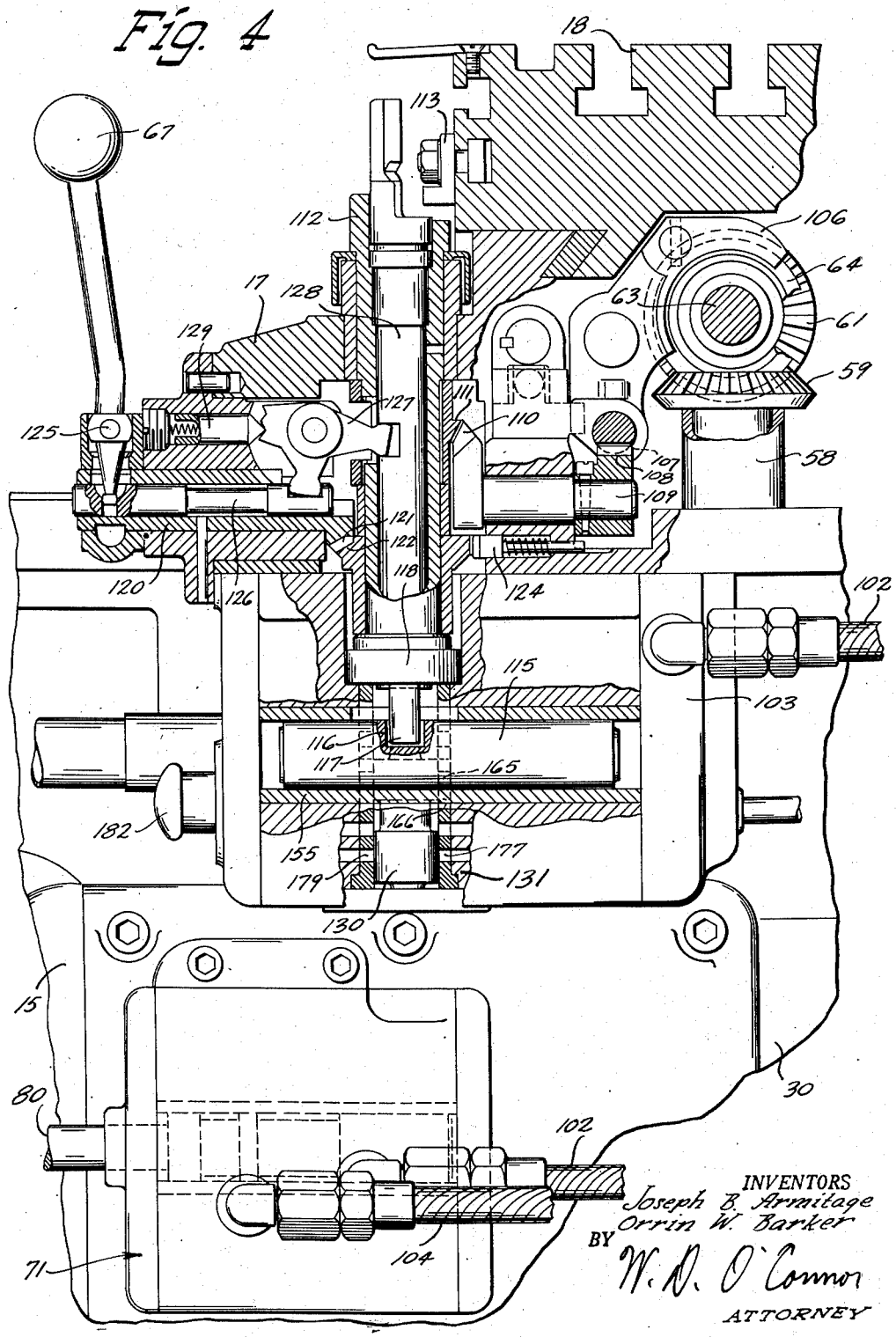

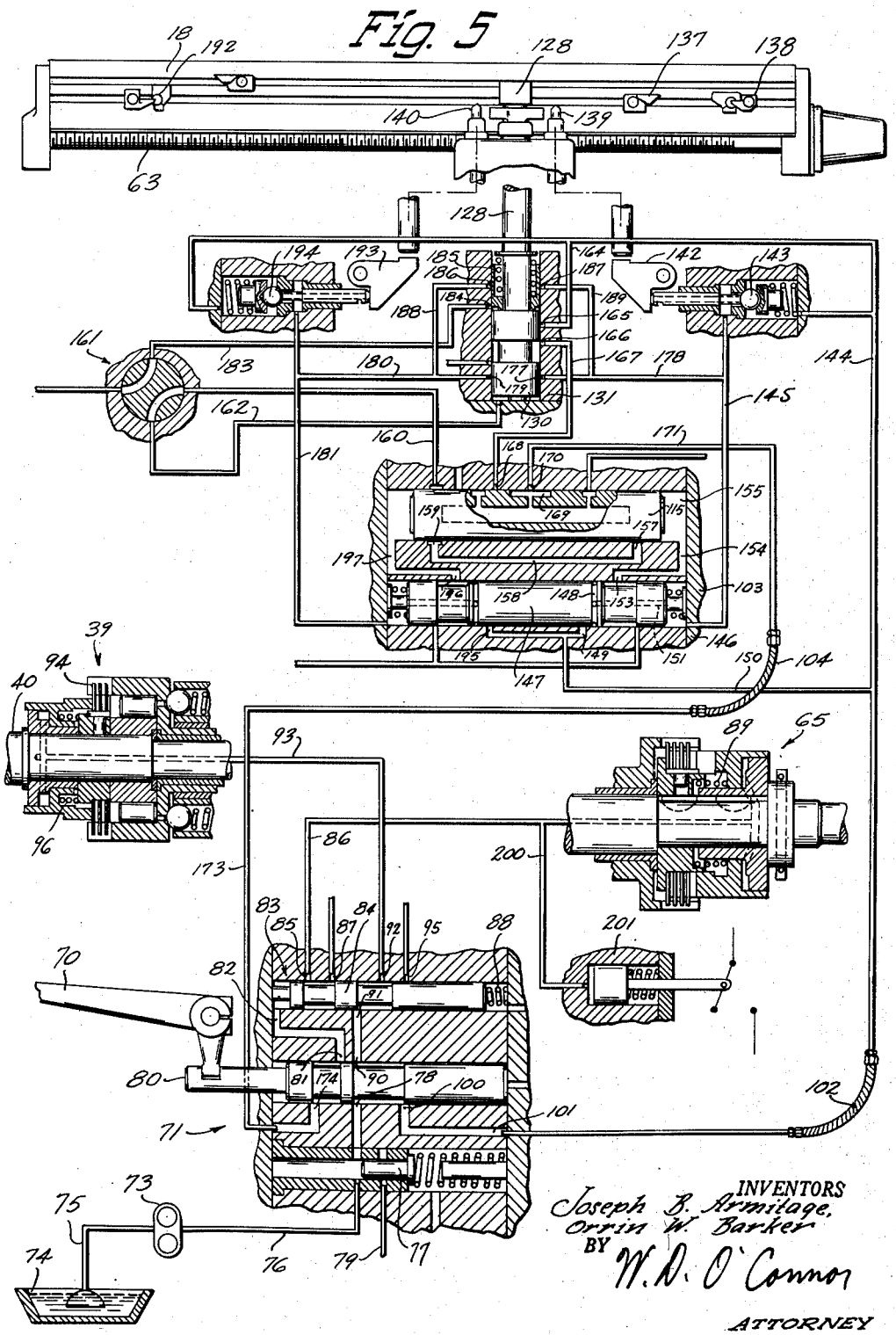

Patented Dec. 12, 1950

2,533,753

UNITED STATES PATENT OFFICE 2,533,753

MACHINE TOOL CONTROL MECHANISM

Joseph B. Armitage, Wauwatosa, and Orrin W. Barker, Milwaukee, Wis., assignors to Kearney & Trecker Corporation, West Allis, Wis., a corporation of Wisconsin Application February 27, 1947, Serial No. 731,308

12 Claims. (Cl. 90—21)

1

This invention relates, generally, to machine tools and more particularly to improved control mechanism for the power actuated elements of a machine tool.

A general object of the invention is to provide improved controlling arrangements for the actuating mechanism of a machine tool.

Another object of the invention is to provide an improved machine tool control system especially adapted for effecting automatic operation of a milling machine of the knee and column type.

Another object is to provide an improved control system for a knee type milling machine wherein automatic trip mechanism is carried by the movable table supporting saddle and functions to actuate mechanism in the knee of the machine.

Another object is to provide an improved control system for operating a rapid traverse clutch in a machine tool in conjunction with a feed synchronizing clutch.

Another object is to provide an improved control system for a rapid traverse drive mechanism in the knee of a milling machine, including a control lever mounted on the knee, as well as manual and automatic remote control mechanism mounted on the relatively movable saddle of the machine.

Another object is to provide an improved hydraulic rapid traverse clutch actuating mechanism for a machine tool.

Another object is to provide a milling machine having movable knee, saddle and table elements with hydraulic control mechanism carried by one of the elements and operative to control the movement of any of the movable elements.

A further object of the invention is to provide a movable machine tool element with hydraulic control means to control the movement of a second movable element selectively at either one of two rates according to a predetermined operating cycle.

According to this invention, there is provided an improved control system for a machine tool especially adapted for milling machines of the knee and column type, whereby fully automatic operation of the machine table in continuous cycle may be effected. To this end, the rapid traverse mechanism in the knee may be controlled hydraulically by actuating a lever on the knee or may be remotely controlled from the machine saddle in coordination with automatic or manual control of the table movements. The control apparatus on the saddle includes hydraulically actuated table reversing mechanism operated by trip mechanism which simultaneously effects hydraulic control of the rapid traverse drive in the knee through an interconnecting flexible conduit. A hand lever on the saddle is arranged for manual reversal of the table and selection of feed or rapid traverse rate, a hydraulic interlock being arranged to prevent the lever from engaging the rapid traverse drive while the table control is in neutral position. A feed synchronizing clutch is provided for quickly reducing the rate of table movement when the rapid traverse drive is disconnected and is hydraulically interlocked to prevent engagement of both the rapid traverse clutch and synchronizing clutch simultaneously.

The foregoing and other objects of this invention, which will become more fully apparent from the following detailed description, may be achieved by the particular illustrative machine tool depicted in and described in connection with the accompanying drawings, in which:

Fig. 3 is a diagrammatic view of the work feeding and rapid traverse transmission mechanism incorporated in the machine;

Fig. 4 is an enlarged view, partly in vertical section through the saddle, of the hydraulic control mechanism shown in elevation in Fig. 2; and Fig. 5 is a schematic circuit diagram of the hydraulic control mechanism incorporated in the machine.

Figure 1:
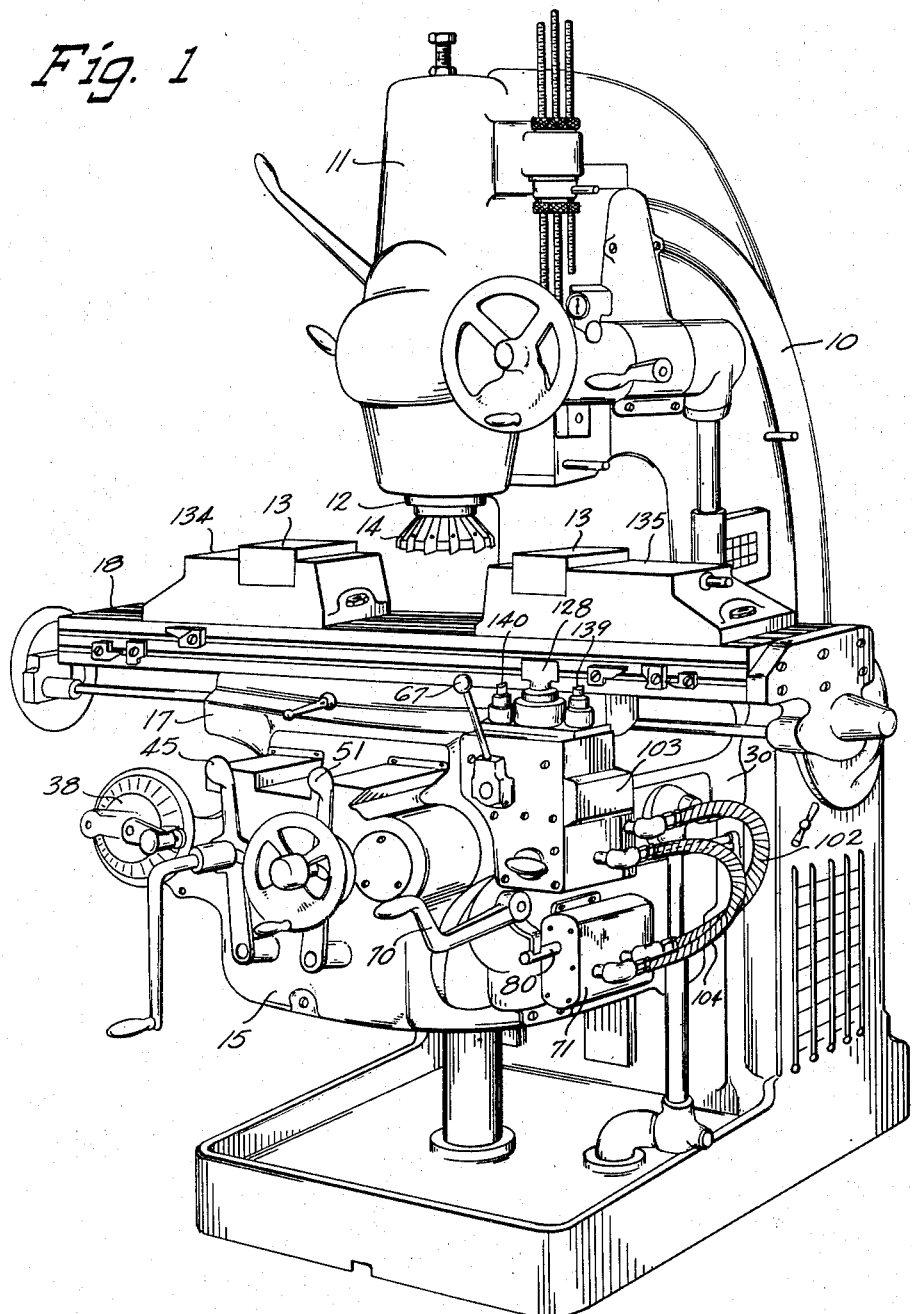
Figure 1 is a view in perspective of a milling machine of the knee and column type incorporating the novel features of the present invention.

Although the particular machine tool shown in the drawings as exemplifying a preferred embodiment of the invention, is a milling machine of the knee and column type, it is to be understood that various features of the invention may be utilized with advantage in other machine tools of different construction.

Referring more specifically to the drawings and particularly to Fig. 1 thereof, the milling machine there shown comprises essentially an integrally formed base and hollow upright column structure 10 that constitutes a supporting frame carrying the cooperating tool supporting and work supporting elements of the machine. The column 10 carries at its upper forwardly projecting end a vertically movable head 11 in which is rotatably mounted a vertically disposed spindle 12 constituting the tool supporting element of the machine.

The complementary work supporting element of the machine is movably mounted beneath the vertical spindle 12 for supporting workpieces 13 in cooperative relationship with a milling cutter 14 carried by the spindle. The work supporting element includes the usual knee structure 15 which is slidably mounted for vertical movement along the forward face 16 of the column 10. The knee 15 carries on its upper surface a saddle 17 that is slidably mounted thereon for horizontal movement toward or from the column 10. The saddle 17, in turn, carries on its upper surface a work supporting table 18 that is slidably mounted thereon for longitudinal reciprocating movement parallel with the column face 16. The arrangement of the superimposed sliding work supporting elements is such that a workpiece mounted on the table 18 may be moved along any of three mutually transverse paths in positioning it relative to a cutter in the spindle 12.

Figure 2:
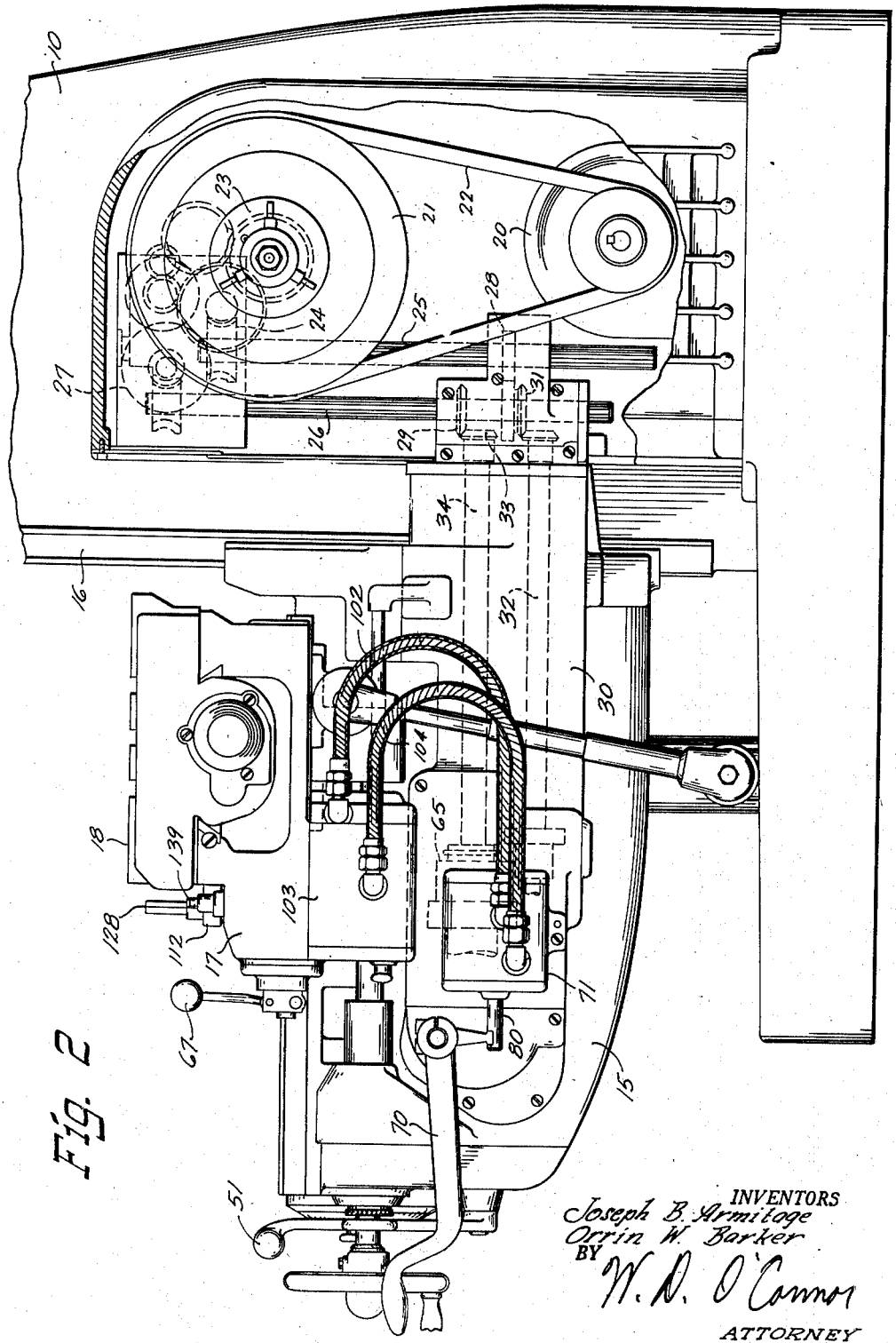
Fig. 2 is an enlarged view in right side elevation of the machine shown in Fig. 1, the upper part of the column and other parts having been broken away.

Power for rotating the cutter spindle 12 and for effecting power driven movements of the superimposed work supporting elements, is derived from a motor 20 mounted in the base of the hollow column 10, as best shown in Fig. 2. The motor 20 drives a main pulley 21 rotatably mounted on the side of the column 10 by means of multiple belts 22, the drive being enclosed by a hinged door. From the driving pulley 21, power is transmitted to rotate the spindle 12 by means of suitable speed selecting transmission mechanism within the column, such as that shown in Patent No. 2,182,421, issued December 5, 1939, to Joseph B. Armitage.

The pulley 21 is selectively connected with the spindle driving transmission mechanism by means of the usual friction clutch 23. Power for effecting feeding movements of the work supporting structure is derived from the spindle driving transmission through gearing 24 connected to operate a vertically disposed splined feed shaft 25 at the right side of the column 10, the arrangement being such that the shaft 25 is driven when and only when the clutch 23 is engaged to drive the spindle transmission. Since it is desirable to provide for movement of the work supporting elements at rapid traverse rate when the spindle is not being driven, a second splined shaft 26, disposed parallel with the shaft 25, is operatively connected by gearing 27 to be driven directly from the belt pulley 21 for effecting rapid traverse movements regardless of whether or not the clutch 23 is engaged.

The vertically disposed splined shafts 25 and 26 have sliding engagement with a spur pinion 28 and a bevel pinion 29, respectively, that are rotatably mounted in the rearwardly projecting end of a bracket 30 secured on the right side of the knee 15, the arrangement being such that vertical movement of the knee 15 may occur without interferring with the driving connections to the bracket. The spur pinion 28 on the vertical feed shaft 25 is connected through spur and bevel gearing 31 to drive a horizontally disposed feed shaft 32 in the bracket 30 while the bevel pinion 29 on the vertical rapid traverse shaft 26 cooperates with a bevel gear 33 on a parallelly disposed horizontal rapid traverse shaft 34, likewise carried by the bracket 30.

Referring now to the diagrammatic view of the feed train shown in Fig. 3, the horizontal feed shaft 32 is connected by gearing 36 to a feed rate changing transmission mechanism 37 that is housed within the knee 15. The rate changing mechanism 37 is arranged to be adjusted in well known manner through operation of a feed rate adjusting and indicating device 38 mounted on the front of the knee 15 as shown in Fig. 1, the adjusting mechanism being more fully described in the previously mentioned Patent No. 2,182,421. From the rate changing mechanism 37, power is transmitted at the selected feed rate through an overrunning clutch and torque limiting coupling unit 39 and a shaft 40 to a disconnecting and reversing mechanism 41.

The mechanism 41 includes oppositely rotating clutch gears 42 and 43 arranged to be engaged selectively by a sliding clutch collar 44 through operation of a selector lever 45 on the front of the knee 15, to effect actuation of a knee elevating screw 46 in direction to move the knee up or down as desired, at the selected feed rate. A second pair of oppositely rotating clutch gears 48 and 49, may be engaged selectively by a clutch collar 50 actuated by a selecting lever 51 on the front of the knee to effect rotation of a saddle operating screw 52 for moving the saddle 17 toward or from the column 10 as desired, at the selected feed rate.

Power for operating the table 18 is transmitted from the feed rate shaft 40, through the gears of the reversing and disconnecting mechanism 41, to a gear 54 which meshes with the clutch gear 49 and is secured to a splined shaft 55 disposed longitudinally of the knee 15. The splined shaft 55 has sliding engagement with a bevel gear 56 that is rotatably mounted in the saddle 17, and that meshes with a complementary gear 57 on a vertically disposed stub shaft 58. At its upper end, the shaft 58 carries a bevel gear 59, which meshes with and drives oppositely rotating bevel clutch gears 61 and 62, rotatably mounted in the saddle concentric with a lead screw 63, journalled at its ends in the respective ends of the table 18.

The reversing bevel clutch gears 61 and 62 are rotatably mounted concentric with the table lead screw 63 and are disposed to be engaged selectively by an intermediate slideable clutch spool or collar 64, that is splined to the lead screw and operates to turn it in either direction selectively, the screw having threaded engagement with a nut (not shown) fixed in the saddle 17 in well known manner, whereby the table 18 may be caused to execute a movement in either direction selectively, at the selected feed rate.

The horizontal rapid traverse driving shaft 34 in the bracket 30 is connected by means of a hydraulically actuated clutch 65 and gearing 66 with the reversing and disconnecting mechanism 41 in the knee 15, the arrangement being such that when the rapid traverse clutch 65 is engaged, the reversing clutch gears for actuating the knee, saddle and table will all be operated at rapid traverse rate, the overrunning clutch unit 39 serving to permit rapid traverse operation without interference by or influence upon the rate changing mechanism 37.

In order that the table 18 may be caused to perform a predetermined series of movements automatically in either direction at feed or rapid traverse rate in effecting automatic machining of workpieces, means are provided in accordance with this invention for shifting the clutch spool 64 hydraulically in coordination with remote control of the hydraulic rapid traverse clutch 65 and other functions in predetermined sequences. The clutch spool 64 may also be shifted by direct action of trip dogs on the table 18 or by operation of a manually actuated control lever 67 on the front of the saddle 17.

Manual control of the hydraulically actuated rapid traverse clutch 65 is effected by means of a rapid traverse lever 70 on the right side of the knee 15, that is connected to operate a hydraulic rapid traverse valve 71, the arrangement being such that when the lever 70 is lifted upward, the valve 71 admits pressure to engage the rapid traverse clutch 65, thereby causing rapid traverse movement of the work supporting table 18 in accordance with the conditions of engagement of the various reversing and disconnecting clutches.

As best shown in the circuit diagram, Fig. 5, hydraulic pressure for effecting operation of the rapid traverse clutch 65 and performing the other control functions of the machine, is derived from a pump 73 mounted in the knee 15 and continuously driven by the rapid traverse shaft 34, as shown in Fig. 3. The pump 73 draws fluid from a sump 74 in the bottom of the knee through a conduit 75 and discharges it under pressure through a conduit 76 and past a pressure limiting relief valve 77 to a port 78 of the rapid traverse valve 71. Excess fluid overflowing through the relief valve 77 enters a conduit 79 leading to the lubricating system in the knee 15.

When the rapid traverse lever 70 is moved to its upper position, it moves a valve plunger 80 in the valve 71 to the left, as seen in Fig. 5, thereby establishing communication from the pressure port 78 connected with the pressure conduit 76 to a valve port 81 which connects with a passage 82 leading to the left end of a sequence valve 83. Pressure in the left end of the sequence valve moves a plunger 84 thereof to the right, thereby uncovering a port 85 and establishing communication through it to a conduit 86 leading to the rapid traverse clutch 65, the arrangement being such that the fluid pressure operates to engage the clutch for effecting rapid traverse drive. When the lever 70 is released, it moves downward by gravity returning the valve plunger 80 to the position shown in Fig. 5, thereby cutting off the supply of pressure through the port 81 to the left end of the sequence valve 83. A spring 88 at the right end of the valve then moves the plunger 84 to the left, thereby placing the port 85 in communication with a port 87 which is opened to the atmosphere and serves to exhaust the fluid pressure from the rapid traverse clutch 65, whereupon a spring 89 in the clutch moves it to disengaged position.

With the valve plungers 80 and 84 in the feed position, as shown in the drawing, the pressure port 78 of the rapid traverse valve 71 has communication with a port 90 that connects with a port 91 of the sequence valve 83. The port 91 is then in communication with a port 92 from which a conduit 93 leads to a pressure actuated retarding or synchronizing clutch 94 associated with the overrunning clutch unit 39. Through operation of the sequence valve 83, as just described, the synchronizing clutch 94 is engaged immediately after the rapid traverse clutch 65 is disengaged, and serves to retard movement of the work supporting structure quickly from rapid traverse rate to the selected feed rate, thereby preventing overrunning and possible damage through unexpected continued coasting of the support after the rapid traverse clutch is disengaged. Since it is necessary that the synchronizing clutch 94 be disengaged before the rapid traverse clutch is engaged, when the rapid traverse lever 70 is lifted the sequence valve 83 operates immediately to close the pressure port 91 before admitting pressure through the port 85 to the rapid traverse clutch and then establishes communication between the port 92 leading to the synchronizing clutch and an exhaust port 95, thereby permitting the clutch 94 to be moved to disengaged position under the action of a spring 96.

As previously mentioned, additional control means are provided for effecting automatic operation of the table 18 in performing a cycle of successive movements at feed and rapid traverse rates. As shown in Fig. 5, when the rapid traverse lever 70 is in the lower or feed position, the pressure port 78, connected with the pressure conduit 76 leading from the pump 73, is in communication with a port 100 connected with a conduit 101 in the valve body 71 on the knee 15. From the conduit 101 a flexible pressure conduit 102 leads to a valve body 103 on the relatively movable saddle 17. A second flexible conduit 104 constitutes a return line from the valve box 103 on the saddle to the rapid traverse valve 71 for effecting coordinated automatic remote control of the rapid traverse drive, as previously mentioned.

Referring more particularly to the sectional view of the table controlling mechanism shown in Fig. 4, the arrangement for effecting automatic or manual control of the table reversing and disconnecting clutch is generally similar to that shown in Patent No. 2,407,913, issued September 17, 1946, to Joseph B. Armitage and Orrin W. Barker. As shown, the mechanism includes a clutch shifting fork 106 that engages a groove in the clutch spool 64 and is slidably mounted for movement in the saddle in direction parallel to the lead screw 63. Rack teeth 107 on the shifter fork 106 engage the teeth of a spur gear segment 108 on one end of a control shaft 109, the other end of which carries a bevel gear segment 110. The bevel segment 110 meshes with a complementary bevel segment 111 on a vertically disposed rotatably mounted tripping sleeve 112. The upper end of the tripping sleeve 112 projects above the saddle for engagement by a trip dog 113 on the table 18 in well known manner, whereby the clutch spool 64 may be moved to disconnecting position upon the table arriving at a predetermined position, as determined by the setting of the cooperating trip dog.

Since operation of the trip dog on the sleeve 112 cannot cause reengagement of the clutch spool 64 with one of the reversing clutch gears, as is required for effecting reversal in the direction of table movement, auxiliary power means, including a hydraulically actuated piston 115, is arranged to effect the necessary further movement for automatic reversal. As shown, the piston 115 presents a transverse slot 116 which engages a depending lug 117 on an arm 118 that projects outwardly from the tripping sleeve 112, the arrangement being such that the sleeve may be turned in the one or the other direction by the application of fluid pressure to the one or the other end of the piston 115.

As previously mentioned, shifting of the reversing clutch spool 64 may also be effected by movement of the hand lever 67, the lever being pivotally mounted on the projecting end of a rotatable sleeve 120. The inner end of the sleeve 120 carries a bevel gear segment 121 which meshes with a complementary segment 122 on the tripping sleeve 112, the arrangement being such that when the lever 67 is swung from its vertical neutral position to the right, the tripping sleeve 112 will be turned in direction to effect engagement of the clutch spool 64 in manner to effect movement of the table to the right. Similarly, movement of the lever 67 to the left engages the clutch to effect movement of the table to the left. A spring pressed detent mechanism 124 functions to retain the tripping sleeve 112 in any one of its three operating positions.

The hand lever 67 furthermore operates to effect movement of the table 18 at rapid traverse rate selectively. For this purpose, the lever is mounted on the sleeve 120 by a pivot pin 125 in such manner that it may be tilted toward the table for feed rate operation or away from the table for rapid traverse rate operation. As shown, the lower end of the lever 67 engages a sliding control rod 126 within the sleeve 120, which is engaged at its inner end with one arm of a bell crank 127. Another arm of the bell crank 127 engages a tripping post 128 that is slidably mounted within the tripping sleeve 112 for vertical movement. A spring pressed detent mechanism 129 engages another arm of the bell crank 127 in manner to retain the post 128 in either its upper or its lower position. At its lower end, the tripping post 128 carries a rapid traverse valve piston 130 that cooperates with a rapid traverse valve body or cylinder 131. The upper end of the tripping post 128 projects above the sleeve 112 in position to be engaged by trip dogs on the table 18, the arrangement being such that when the post is in the lower position shown in Fig. 4, the table will operate at feed rate and when the post is moved to its upper position the rapid traverse clutch 65 is engaged to effect movement at rapid traverse rate. In addition to being movable manually by the lever 67 and mechanically by direct action of trip dogs on the table, the post 128 may be moved upward to rapid traverse position through the application of hydraulic pressure to the lower end of the cylinder 131 for lifting the valve plunger 130 in effecting coordinated automatic control of the table 18.

By providing two work holding fixtures 134 and 135 in spaced relationship on the table 18, as shown in Fig. 1, the machine may be caused to operate in manner to machine successive workpieces 13 automatically in a continuous cycle through operation of the control system functioning in accordance with this invention. That is, the workpiece 13 in one of the fixtures may be fed past the cutter 14, while the other fixture is being loaded by the machine operator. At the end of the cutting stroke, the direction of table movement is reversed automatically and movement in the other direction is effected at rapid traverse rate to bring the new workpiece in the other fixture into juxtaposition with the cutter. The rate of table movement is then reduced to feed rate and the second workpiece is fed past the cutter, the table being again reversed at the end of the feeding stroke. This automatic cycle may be continued indefinitely without attention from the operator beyond unloading and reloading the work holding fixtures successively.

Assuming that the work table 18 is moving from right to left at rapid traverse rate, a feed dog 137 on the table will engage the tripping post 128, moving it downward to feed position as the fixture 135 approaches the cutter 14. Further movement of the workpiece 13 relative to the cutter 14 will then occur at feed rate through the cutting stroke, whereupon a reversing dog 138 on the table will engage a reversing trip plunger 139 at the right of the tripping post 128 for effecting automatic reversal in the direction of table movement. A similar reversing plunger 140 is positioned at the left of the tripping post for effecting automatic reversal when the table is operating in the other direction.

As shown in the circuit diagram Fig. 5, when the tripping plunger 139 is engaged and depressed by the reversing dog 138, it operates through a bell crank 142 to open a poppet valve 143 that admits pressure fluid from a pressure conduit 144 that is connected with the flexible pressure conduit 102 leading from the knee to the saddle. Pressure fluid admitted through the poppet valve 143 flows through a conduit 145 into the right end of a reversing valve housing 146, causing a reversing valve plunger 147 therein to be moved to the left. As the plunger 147 moves to the left, a groove 148 therein comes into register with a pressure port 149 in the housing that is connected by a conduit 150 directly with the pressure conduit 144. From the groove 148, pressure fluid flows longitudinally through a passageway 151 in the valve plunger to the right end of the valve 146, thereby exerting additional force to move the valve plunger 147 to the left and to retain it in that position. With the plunger 147 in the left position, communication is established from the pressure port 149 to a port 153 connecting with a passageway 154 leading to the right end of a reversing cylinder 155 in which the reversing piston 115 is slidably mounted. Pressure in the right end of the cylinder 155 moves the piston 115 to its extreme left position, thereby turning the tripping sleeve 112 and shifting the clutch collar 64 into engagement with the opposite clutch gear for effecting movement of the table in the reverse direction.

When the piston 115 moves to the left, it uncovers a port 157 in the cylinder wall which communicates through a passageway 158 to an annular port 159 at the other end of the cylinder. From the port 159, a conduit 160 leads to a selector valve 161 by which it is connected with a conduit 162 leading to the lower end of the rapid traverse valve body 131. Fluid pressure in the lower end of the rapid traverse valve body 131 causes the valve plunger 130 therein to move upward to rapid traverse position, as previously mentioned. With the plunger 130 in the upper position, pressure from the pressure conduit 144 flows through a branch conduit 164 to a port 165, which is then in communication with a port 166 leading to a conduit 167. The conduit 167 leads to a port 168 in the wall of the reverser cylinder 155, the port 168 being then in communication through a groove 169 in the reversing piston 115, with a port 170 in the wall that is connected to a conduit 171. The conduit 171 connects with the flexible return conduit 104 leading to the rapid traverse valve 71 where it is connected to a conduit 173 that communicates with a port 174 in the rapid traverse valve casing. With the rapid traverse valve plunger 80 in the feed position shown in the drawing, the port 174 has communication with the port 81 for exerting pressure through the passageway 82 upon the left end of the sequence valve plunger 84. As previously explained, this results in moving the plunger 84 to the right, thereby closing the pressure port 91 to cut off pressure to the synchronizing clutch 94, in order to disengage it. Further movement of the piston 84 to the right uncovers the port 85 and permits flow of the pressure fluid into the conduit 86 leading to the rapid traverse clutch 65. This results in engaging the rapid traverse drive in order that movement of the table 18 in the reverse direction may occur at rapid traverse rate.

When the rapid traverse valve piston 130 is in the upper position, communication is established through the lower end of the valve body 131, between a port 177 connected by a conduit 178 and the conduit 145 to the right end of the reversing valve housing 146 and a port 179 connected by a conduit 180 and a conduit 181 to the left end of the reversing valve housing 146. This results in neutralizing the pressures on the ends of the reversing valve 147 and permits it to return to its central neutral position under the influence of centralizing springs.

In the event that it is desired to effect movement of the table in reversed direction at feed rate instead of at rapid traverse rate, the selector valve 161 may be turned by means of an actuating handle 182, through 90° to its other position. This results in connecting the pressure conduit 160 from the reversing cylinder 155 with a conduit 183 that leads to a port 184 in the rapid traverse valve housing 131 above the piston 130. Pressure exerted through the port 184 acts upon the lower face of the spring pressed valve sleeve 185, causing it to move upward to establish communication between ports 186 and 187. These ports are connected respectively by conduits 188 and 189 to the conduits 180 and 178 leading to the respective ends of the reversing valve casing 146, whereby to effect neutralization of pressure on the ends of the valve plunger 147 to permit it to centralize.

As the table 18 approaches the end of its movement from left to right, another reversing dog 192 engages the left reverse tripping plunger 140, moving it downward and operating through a bell crank 193 to open a poppet valve 194. This establishes communication from the pressure conduit 144 to the conduit 181 leading to the left end of the reversing valve housing 146, the pressure thus exerted causing the reversing valve plunger 147 to move to the right. This establishes communication from a pressure port 195, connected by the conduit 150 to the pressure conduit 144, to a port 196 connected by a conduit 197 to the left end of the reversing cylinder 155. Pressure in the cylinder 155 results in moving the reversing piston 115 to the right, thereby shifting the reversing clutch spool 64 into engagement with the opposite clutch gear to provide for movement of the table in the reverse direction. Movement of the reversing piston 115 to the right, uncovers the port 159, thereby establishing communication through the conduit 160 to the selector valve 161. As previously explained, with the valve 161 in the position shown, the conduit 160 is connected to the conduit 162 leading to the bottom of the rapid traverse valve casing 131. Pressure in the bottom of the casing 131 moves the piston 130 upward to rapid traverse position, thereby establishing the connections whereby pressure is applied to engage the rapid traverse clutch 65 for movement of the table in reversed direction at rapid traverse rate.

Since it is desirable to stop the spindle 12 when the table is reversed at the completion of a cut to prevent the cutter 14 from marring the finished workpiece 13, a hydraulic connection is provided from the rapid traverse clutch actuating conduit 86 through a conduit 200 to a pressure actuated switch 201. The switch 201 may be electrically connected to effect disengagement of the spindle driving clutch 23 to stop the spindle during reverse movement of the table at rapid traverse rate. Alternatively, the spindle may be stopped through direct hydraulic action, for instance by connecting the conduit 200 directly with hydraulic means for disengaging the main clutch 23 in the manner described in the previously mentioned Patent No. 2,407,913. In machines of the type shown in co-pending application Serial No. 519,366, filed January 22, 1944, now Patent No. 2,497,842, issued February 14, 1950, in which the motor driving the spindle is separate and distinct from the motor effecting movements of the work support, the switch 201 may be electrically connected to stop the spindle driving motor through a plugging or other braking action.

As previously explained, the rapid traverse valve plunger 130 may be moved to rapid traverse position manually by tilting the lever 67 outwardly from the table 18. However, since it is not desirable that the rapid traverse clutch be held in engagement when the reversing clutches are in neutral, the port 169 in the reversing piston 115 is so arranged that it is cut off from communication with the port 168 when the clutch spool 64 is in neutral position, thereby preventing the transmission of pressure fluid from the valve housing 131 into the flexible conduit 104 leading to the rapid traverse valve 71.

From the foregoing detailed description of and explanation of the operation of the exemplifying knee and column type milling machine herein set forth as a practical embodiment of the present invention, it will be apparent that there has been provided an improved control mechanism for a machine tool and more particularly for a milling machine of the knee and column type, whereby the work supporting table of the machine may be operated automatically in a continuous cycle or various other cycles for facilitating the rapid and economical machining of workpieces.

Although the illustrative embodiment of the invention has been described in considerable detail for the purpose of disclosing a practical operative structure whereby the invention may be practiced advantageously, it is to be understood that the particular apparatus described is intended to be illustrative only and that the various novel characteristics of the invention may be incorporated in other structural forms without departing from the spirit and scope of the invention, as defined in the subjoined claims.

The principles of the invention having now been fully explained in connection with the foregoing description of the embodying apparatus, we hereby claim as our invention:

1. In a milling machine, the combination with a column, a power source associated with said column, a tool retaining spindle rotatably mounted in said column and driven from said power source, a plurality of superimposed work supporting members including knee, saddle and table members slidably mounted on said column for movement relative to said column and to each other, a transmission carried in said knee, a feed rate power connection from said transmission with said power source, a rapid traverse power connection including a hydraulic clutch connecting said transmission with said power source, a reversing and disconnecting means for each of said members operatively connected to said transmission for selective operation of said associated member at either feed of rapid traverse rates, a hydraulic control mechanism on said knee manually operable to control the operation of either of said members at rapid traverse rate, a hydraulic control mechanism on said movable saddle member disposed to control the operation of said table member at feed or rapid traverse rates, and a plurality of flexible connectors between said control mechanisms whereby said members may move relative to each other without interfering with the operation of said control mechanisms.

2. In a machine tool, a column member, knee, saddle and table members slidably disposed for relative movement in a plurality of perpendicular planes on said column, a power source, a feed transmission in said knee connected to said power source and disposed to drive said knee, saddle and table selectively at feed rate, a rapid traverse transmission connected to said power source and disposed to drive said slidable members selectively at rapid traverse rate, a clutch operatively connected in said rapid traverse transmission, a dual control mechanism operative from two of said members and connected to said clutch mechanism, a manual control actuator disposed to operate said control mechanism on one of said members, a manual and automatic control actuator disposed to operate said control mechanism on another of said members and flexible interconnecting means between said control mechanisms, whereby said members may be moved relative to one another without affecting the operation of said control mechanisms.

3. In a machine tool having relatively movable members slidably mounted for relative movement on a column, a transmission mechanism contained in one of said members, a hydraulic clutch operable when engaged to drive said transmission mechanism at a constant feed rate, a control mechanism hydraulically connected to said clutch and operable to engage said clutch, a clutch and brake mechanism in said transmission operable to override parts of said transmission when said rapid traverse clutch is engaged and operable to brake parts of said transmission during operation at feed rate when said rapid traverse clutch is disengaged, and interlocking hydraulic control mechanism operative to insure the release of said brake before said hydraulic clutch is actuated into operative engagement.

4. In a machine tool, a base, a member movably mounted on said base, power actuated apparatus connected to effect movement of said member including transmission mechanism adapted to move said member at feed rate, other transmission mechanism adapted to move said member at rapid traverse rate, a hydraulically actuated friction clutch disposed to connect said rapid traverse transmission mechanism to said member selectively, a hydraulically actuated synchronizing clutch disposed to connect said feed rate transmission mechanism to said member selectively to reduce its rate of movement from rapid traverse rate to feed rate, a hydraulic control system connected to operate said clutches, and an interlocking control valve operative selectively to effect engagement of said rapid traverse clutch only when said synchronizing clutch is disengaged and to effect engagement of said synchronizing clutch only when said rapid traverse clutch is disengaged, whereby said valve is arranged to prevent engagement of both said rapid traverse clutch and said synchronizing clutch simultaneously.

5. In a milling machine the combination including a column, a power source carried in said column, a transmission mechanism operatively connected to be driven by said power source, a tool spindle rotatably carried in said column and power driven from said transmission mechanism selectively at a plurality of speed rates, a plurality of superimposed relatively movable work supporting members slidably mounted on said column, a transmission means connectibly driven from said power source and serving to slidably drive each of said members independently and selectively at any one of a plurality of feed rates, a rapid traverse drive mechanism carried by one of said movable elements and connected to said power source to selectively drive said transmission means at rapid traverse rate, a hydraulic control mechanism carried on said member with said rapid traverse clutch to afford manual control of the movement of any of said members at rapid traverse rate, a second hydraulic control mechanism carried on another of said members and operatively connected to said first mentioned control means to provide automatic feed or rapid traverse movement of a predetermined one of said members, and adjustable trip dogs carried by said predetermined member to operatively engage said second control mechanism whereby the automatic operating cycle of said predetermined member may be selectively adjusted by positioning said dogs to precisely control the cyclic operation of said member.

6. In a milling machine of the knee and column type, table driving mechanism including a rapid traverse clutch mounted in the knee of the machine and a reversing clutch mounted in the relatively movable saddle of the machine, hydraulic control mechanism mounted in said saddle and operatively connected to control said table reversing clutch, and a flexible conduit interconnecting said control mechanism on said saddle with said rapid traverse clutch in said knee for effecting coordinated control of reversing and rate changing functions.

7. In a milling machine, a column, a power source in said column, a plurality of superimposed relatively movable members slidably mounted on said column, transmission means for selectively driving each of said members from said power source in said column, a rapid traverse drive mechanism connecting with said transmission, a hydraulically operated clutch in said drive mechanism to selectively connect said drive with said transmission, a hydraulic control mechanism carried on one of said members and operably connected to operate said clutch, manual means to operate said control mechanism, a second control mechanism carried on another of said members, manual and automatic means to operate said second control mechanism, and flexible interconnecting means between said second control mechanism and said first mentioned control mechanism and operatively connected to operate said clutch selectively, whereby said control mechanisms are relatively movable without disturbing the effective control of said mechanisms.

8. In a milling machine of the knee and column type, comprising a column, a knee slidably mounted on said column, a saddle slidably mounted on said knee and a table slidably mounted on said saddle, the combination with power actuating mechanism mounted in said knee including a rapid traverse driving clutch, and table reversing mechanism mounted in said saddle and operatively connected to be driven from said mechanism in said knee, of hydraulically actuated control mechanism in said saddle responsive to table movement and operative to actuate said table reversing mechanism, and flexible conduit means interconnecting said control mechanism in said saddle with said rapid traverse driving clutch in said knee for effecting control of said rapid traverse clutch in coordinated relationship with control of said table reversing mechanism.

9. In a milling machine comprising a column, a knee slidably mounted on said column, a saddle slidably mounted on said knee, a table slidably mounted on said saddle, power driven actuating mechanism including rate selecting apparatus mounted in said knee, table actuating mechanism including direction selecting apparatus mounted in said saddle and operatively connected to be driven by said actuating mechanism in said knee and to drive said table, hydraulically actuated control mechanism carried by said saddle and responsive to table movement, conduit means interconnecting said control mechanism with said direction selecting apparatus for actuating it in response to table movement, and flexible conduit means connecting said control mechanism on said saddle with said rate selecting apparatus in said knee for controlling the rate of table movement in coordination with control of its direction of movement.

10. In a hydraulic control system for a power driven machine tool having rate selecting and direction reversing mechanism, a hydraulically actuated motor operatively connected to adjust said direction reversing mechanism from a neutral position to positions adapted to effect machine movement in either direction selectively, a control valve operatively connected to control said rate selecting mechanism for effecting said movement at a high rate or at a low rate upon being positioned selectively, means to retain said valve in either its high rate or its low rate position, and an interlocking valve operated by said direction selecting motor and serving to establish an operating connection between said rate selecting valve and said rate selecting mechanism only when said direction selecting motor is in position to effect movement in the one or the other direction, whereby positioning of said rate selecting mechanism in high rate position through operation of said valve while said direction selecting motor is in neutral position is prevented in order to avoid unintentional operation of high rate driving mechanism while said reversing mechanism is in neutral position.

11. In a milling machine of the knee and column type, comprising a column, a knee slidably mounted on said column, a saddle slidably mounted on said knee, a table slidably mounted on said saddle, power driven actuating mechanism including rate selecting apparatus and a hydraulic pressure exerting pump mounted in said knee, table actuating mechanism including direction selecting apparatus mounted in said saddle and operatively connected to be driven by said actuating mechanism in said knee and connected to drive said table, hydraulically actuated control mechanism carried by said saddle said mechanism being responsive to table movement and operatively connected to actuate said direction selecting apparatus, a flexible conduit connecting said pressure exerting pump in said knee to said control mechanism on said saddle to provide hydraulic pressure for actuating it, and another flexible conduit connecting said control mechanism on said saddle with said rate selecting apparatus in said knee for effecting control of the rate of table movement in conjunction with the control of its direction of movement.

12. In a machine tool having a base and a carriage member movably mounted on said base, power actuated apparatus operatively connected to effect movement of said carriage said apparatus including transmission mechanism adapted to effect said movement at feed rate and alternatively operating transmission mechanism adapted to effect said movement at rapid traverse rate, a hydraulically actuated friction clutch selectively engageable to connect said rapid traverse transmission mechanism to operate said carriage, a hydraulically actuated synchronizing friction clutch selectively engageable to connect said feed rate transmission mechanism to said carriage for reducing its rate of movement from rapid traverse rate to feed rate, and a hydraulic control system including interlocking means operatively connected to effect selective engagement of said rapid traverse friction clutch only when said synchronizing clutch is disengaged and to effect selective engagement of said synchronizing friction clutch only when said rapid traverse friction clutch is disengaged, whereby simultaneous engagement of said clutches is prevented.

JOSEPH B. ARMITAGE.
ORRIN W. BARKER.

REFERENCES CITED

The following references are of record in the file of this patent:

UNITED STATES PATENTS

| Number | Name | Date |
|---|---|---|
| 2,182,421 | Armitage | Dec. 5, 1939 |
| 2,198,102 | Armitage | Apr. 23, 1940 |
| 2,215,684 | Armitage | Sept. 24, 1940 |
| 2,235,085 | Roehm et al. | Mar. 18, 1941 |